United States Patent [19]

Greenaway

[11] 4,163,570

[45] Aug. 7, 1979

[54] OPTICALLY CODED DOCUMENT AND METHOD OF MAKING SAME

[75] Inventor: David L. Greenaway, Oberwil, Switzerland

[73] Assignee: LGZ Landis & Gyr Zug AG, Zug, Switzerland

[21] Appl. No.: 848,871

[22] Filed: Nov. 7, 1977

[30] Foreign Application Priority Data

Dec. 21, 1976 [CH] Switzerland .................. 16084/76

[51] Int. Cl.² .......................................... B42D 15/00
[52] U.S. Cl. .................................. 283/8 A; 283/8 B
[58] Field of Search .................. 283/6, 8 R, 8 A, 8 B, 283/9

[56] References Cited

FOREIGN PATENT DOCUMENTS 574144 3/1976 Switzerland .................. 283/8 B

*Primary Examiner*—Willie G. Abercrombie
*Attorney, Agent, or Firm*—Morgan, Finnegan, Pine, Foley & Lee

[57] ABSTRACT

A document is disclosed, which comprises an information carrier in which information is recorded as optical markings. The information carrier has a shape-memorizing capability actuated by supplying energy, such as heat, which changes the shape of the information carrier and the optical markings.

7 Claims, 8 Drawing Figures

OPTICALLY CODED DOCUMENT AND METHOD OF MAKING SAME

BACKGROUND OF THE INVENTION

1. Field of the Invention

This invention relates to optically coded documents, i.e., documents comprising an information carrier on which information is recorded in the form of optical markings.

2. Description of the Prior Art

Documents such as identity cards, credit cards, pre-paid payment tokens which can be devalued in stages, travel tickets, entry cards and the like, carrying information in the form of optical markings, are known in many different forms. Most known documents of this type can be counterfeited fairly easily.

A very high degree of protection against forgery can be obtained if the information is fed into the document in the form of diffraction gratings, holograms or similar light-modifying optical markings. For example, a known document which is used as a pre-paid payment token for obtaining goods or services comprises an information carrier made of thermoplastic material with optical markings impressed in it. The markings, representing units of value, have a structure which modifies incident light by diffraction or refraction. When the document is used in a service machine, telephone, etc., the optical markings are tested for genuineness, and a number of markings corresponding to the amount to be paid is cancelled by fusing or perforating them, scraping them off or otherwise obliterating them. The obliteration process requires a relatively large amount of energy, which in many cases is not readily available.

In a document with a plurality of optical markings impressed in thermoplastic material, which modify incident light in a predetermined manner, it has further been proposed to feed in coded information by subsequently obliterating or altering selected optical markings by the action of heat. Here again a relatively large amount of energy is required to obliterate or alter the markings.

SUMMARY OF THE INVENTION

One object of this invention is to provide a document of the above-mentioned type wherein the optical markings can be obliterated or altered in order to change the information with small expenditure of energy.

Another object of this invention is to provide a document of the above-mentioned type wherein the information carrier has a shape-memorizing capability.

A further object of this invention is to provide a document of the above-mentioned type wherein the information carrier has a shape-memorizing capability which by the application of energy can be caused to change the shape of the information carrier.

According to the present invention there is provided a document comprising an information carrier on which information is recorded in the form of optical markings, wherein said information carrier has a shape-memorizing capability operable by supplying energy to said information carrier and which shape-memorizing capability thereby produces a change in the shape of said information carrier and of said optical markings.

The above, and other objects, features and advantages of this invention, will be apparent in the following detailed description of illustrative embodiments which is to be read in connection with the accompanying drawings.

DESCRIPTION OF THE PREFERRED EMBODIMENTS

Figure 1:
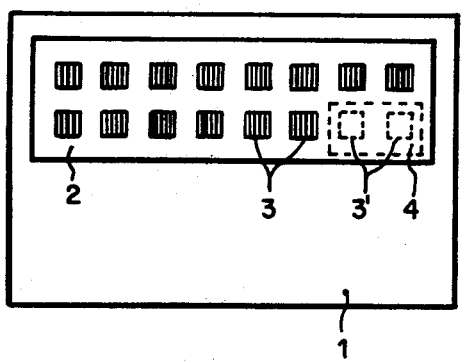
FIG. 1 shows a document.

Referring to FIG. 1, reference numeral 1 represents a document which may be an identity card, credit card, travel ticket, check or check card, entry card, a pre-paid payment token which can be devalued in stages, etc. The document 1 comprises an information carrier 2 into which a plurality of optical markings 3 are fed. Each of the markings 3 represents a piece of information about genuineness. An individual piece of information can be put into the document 1 by obliterating certain markings 3', or at least by altering them so that they produce a different optical effect to the unaltered markings 3. For resons of simplicity the word "obliterate" will hereinafter be used even when the markings 3' are merely altered and not completely obliterated. Depending on the type of document 1, the markings 3' may be obliterated before the document is issued and/or during its use in a service machine or the like.

The information carrier 2 has a shape-memorizing capability which can be put into action by supplying energy. In order to feed the individual piece of information into the document 1, the information carrier 2 is exposed to the action of radiation or heat in the region 4 of the markings 3' to be obliterated. This causes the information carrier 2 to undergo a change of shape in the region 4 on the basis of its shape-memorizing capability. This also brings about a change in the shape of the markings 3' and conversion of the information contained in them.

All types of materials with a shape-memorizing capability which can be put into action by supplying energy, which thereby change their shape in at least one dimension so that the markings 3' undergo an optically perceptible change of shape, are suitable for the information carrier 2. Materials which are particularly appropriate are thermoplastic ones with an elastic stress field stored in them, where the stress field can be relaxed by the action of heat and thereby produce a change in the shape of the information carrier. The elastic stress field is advantageously put into the information carrier 2 by an impressing process during the production of the markings 3, as will be demonstrated below.

Figure 2:
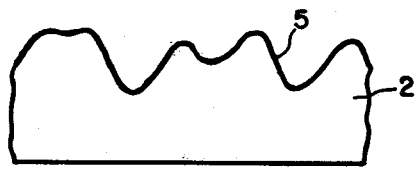
FIG. 2 is a section through an information carrier.
Figure 3:
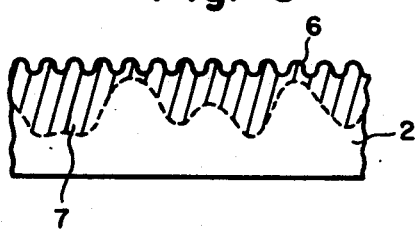
FIG. 3 shows the information carrier of FIG. 2 with an optical marking.

FIG. 2 shows the information carrier 2 made of thermoplastic material, in its initial state. Its surface has an irregular relief structure 5 with a random periodicity, for example, of about 30 microns, which causes dispersion of incident light. This matte surface can be produced during the actual manufacture of the information carrier 2 or in a subsequent impressing process, by means of sand-blasted or similarly treated calender rolls or impressing matrices. The optical markings 3 are impressed in the matte surface by applying pressure and heat; in the FIG. 3 example they have a sinusoidal relief structure 6 with a periodicity of a few microns. If the impressing conditions are suitably selected the first relief structure 5 will disappear and be converted into an elastic stress field 7, resulting from the marked change in the shape of the thermoplastic material in the high regions of the relief structure 5 and the slight change of shape in the low regions thereof.

Figure 4:
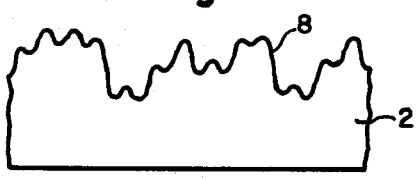
FIG. 4 shows the information carrier of FIG. 2 with an altered optical marking.

With the aid of a heating element, the information carrier 2 is heated beyond the glass transition temperature of the thermoplastic material in the region of the markings 3′ which have to be obliterated. In this way the elastic stress field 7 is relaxed and the original relief structure 5 re-forms. It has been found that the first relief structure 5 is re-established before the second relief structure 6 disappears so that, given careful selection of temperature, a new relief structure 8 (as in FIG. 4) will appear, corresponding to a superimposed arrangement of structures 5 and 6. This obviously presupposes that no pressure or only slight pressure is exerted on the information carrier 2. If the heating element is pressed hard onto the information carrier 2 during the obliteration process, the surface structure of the heating element will be impressed in the carrier.

The optical properties of the resultant relief structure 8 are very advantageous. Whereas the relief structure 6 diffracts incident light, relief structure 8 produces diffused dispersion. This ensures that the unchanged markings 3 can be reliably distinguished from the obliterated markings 3′ with an optical reading instrument. The information provided by the unchanged markings 3 and the obliterated markings 3′ may be read in known manner from the light reflected at the markings 3 and 3′. This is made possible by applying a thin reflective film to the information carrier 2 before or after the relief structure 6 is impressed. It is of course also possible to detect the light transmitted instead of the light reflected.

As compared with the known process of impressing optical markings in a completely smooth, structureless surface, the solution described gives a considerable reduction in the amount of energy required to obliterate the markings 3′, and also a greater difference between the optical properties of the obliterated and unobliterated regions.

Figure 5:
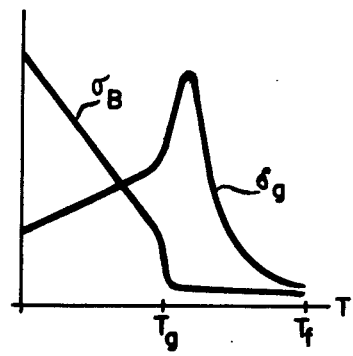
FIG. 5 is a graph.

FIG. 5 shows a typical curve of the tensile strength $\sigma_B$ and expansion $\delta_g$ of a thermoplastic material in dependence on the temperature T. The transition from the solid to the thermoelastic range of states at glass transition temperature $T_g$ is characterized by a sharp drop in tensile strength $\sigma_g$ and a steep rise in expansion $\delta_g$. The transition from the thermoelastic to the thermoplastic range takes place at flow temperature $T_f$. In order to give the information carrier 2 excellent memorizing capability for the first relief structure 5, the second relief structure 6 is advantageously impressed in the carrier 2 in the thermoelastic range. For the same reason the first relief structure 5 is preferably put into the information carrier 2 in the thermoplastic range. To make the first relief structure 5 reappear it is sufficient to heat the information carrier 2 to a temperature in the region of the glass transition temperature $T_g$; the energy requirement for obliterating the markings 3′ is consequently small.

Both the first relief structure 5 and the second relief structure 6 may be of a type such that they diffract, refract or reflect incident light in a characteristic manner, provided that they differ sufficiently from one another. The fineness of the relief structures may extend from Fresnel structures with a periodicity of about 30 microns and more to diffraction structures and holographic relief structures with a periodicity of about one micron. The first relief structure 5 may act as an additional sign of genuineness to safeguard the document 1 against forgeries.

Figure 6:
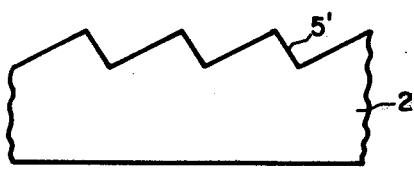
FIG. 6 shows a further information carrier.
Figure 7:
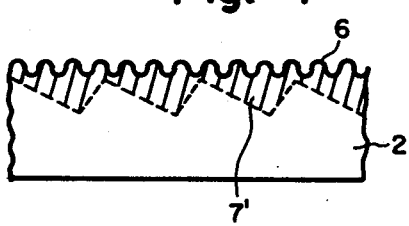
FIG. 7 shows the information carrier of FIG. 6 with an optical marking.
Figure 8:
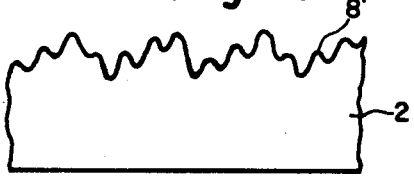
FIG. 8 shows the information carrier of FIG. 6 with an altered optical marking.

A particularly small energy requirement for obliteration and a particularly marked difference between the reading signals obtainable at the obliterated markings 3′ and the non-obliterated markings 3 are obtained if the first relief structure 5 produces dispersion or a characteristic refraction or reflection of incident light by the laws of geometrical optics, and the second relief structure 6 produces a characteristic diffraction of incident light. FIG. 6 shows a first relief structure 5′ of this type, a bevelled profile of sawtooth cross-section. When the second relief structure 6, which may be a phased hologram, a phased diffraction grating, a kinematic shape (kinoform) or the like, is impressed, the first relief structure 5′ is converted into an elastic stress field 7′ (FIG. 7). The relief structure 8′ shown in FIG. 8 and produced by the action of heat reflects incident light in a characteristic way similar to the first relief structure 5′.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A document comprising an information carrier on which information is recorded in the form of optical markings, wherein said information carrier has a shape-memorizing capability to memorize the shape of a relief structure, said capability being operable by supplying energy to said information carrier, thereby producing a change in the shape of said information carrier and of said optical markings.

2. A document according to claim 1 wherein said optical markings are in the form of a second surface relief structure impressed upon a first surface relief structure, and wherein said shape-memorizing capability is an elastic stress field in said information carrier by which stress field said second surface relief structure can be converted into said first surface relief structure which is different from said second surface relief structure, by supplying energy.

3. A document according to claim 2 wherein said information carrier is made of thermoplastic material, and wherein by means of said stress field, said second surface relief structure can be converted into said first surface relief structure by the action of heat.

4. A document according to claim 3 wherein said first surface relief structure causes dispersion, characteristic refraction or characteristic reflection of incident light, and said second surface relief structure produces a characteristic diffraction of incident light.

5. A document according to claim 2, wherein said optical markings are coated with a thin reflective coating.

6. A method of making an optically coded document comprising introducing a first surface relief structure into a thermoplastic information carrier, and subsequently impressing a second surface relief structure into said information carrier in such a way that said first surface relief structure disappears and is converted into an elastic stress field.

7. A method according to claim 6 wherein said first surface relief structure is impressed in said information carrier within the thermoplastic range of the material of said information carrier, and said second surface relief structure is impressed in said information carrier within the thermoelastic range of said material.

* * * * *